(12) United States Patent
Young et al.

(10) Patent No.: US 9,175,833 B2
(45) Date of Patent: Nov. 3, 2015

(54) GRAPHICS DISPLAY MODULE

(71) Applicant: C&D Zodiac, Inc., Huntington Beach, CA (US)

(72) Inventors: William Wai-Loong Young, Long Beach, CA (US); Glen A. Noda, Irvine, CA (US); Ian Geoffrey Scoley, Huntington Beach, CA (US); Nicholas Lee, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 203 days.

(21) Appl. No.: 14/102,486

(22) Filed: Dec. 10, 2013

(65) Prior Publication Data

US 2014/0160775 A1 Jun. 12, 2014

Related U.S. Application Data

(60) Provisional application No. 61/735,962, filed on Dec. 11, 2012.

(51) Int. Cl.
| | |
|---|---|
| *B64D 47/02* | (2006.01) |
| *F21V 21/00* | (2006.01) |
| *B64D 45/00* | (2006.01) |
| *F21S 8/10* | (2006.01) |

(52) U.S. Cl.
CPC ................ *F21V 21/00* (2013.01); *B64D 45/00* (2013.01); *B64D 2045/007* (2013.01); *F21S 48/30* (2013.01)

(58) Field of Classification Search
CPC .. B64D 45/00; B64D 47/02; B64D 2045/007; B60Q 3/02; B60Q 3/0203; B60Q 3/0209; B60Q 3/0243; B60Q 3/0253; B60Q 3/0279; F21V 21/00; F21V 21/02; G09F 2013/044; G09F 2013/0445; G09F 2013/0418; G09F 2013/049; G09F 13/04; G09F 13/0413; F21S 48/30
See application file for complete search history.

(56) References Cited

U.S. PATENT DOCUMENTS

| | | | | |
|---|---|---|---|---|
| 4,373,282 | A | 2/1983 | Wragg | |
| 5,521,578 | A | 5/1996 | DelValle | |
| 6,240,665 | B1 * | 6/2001 | Brown | G09F 13/04 40/570 |
| 7,213,962 | B2 * | 5/2007 | Chen | G02B 6/0021 362/23.01 |
| 8,842,236 | B2 * | 9/2014 | Zhou | G09F 13/04 349/58 |
| 2002/0000057 | A1 * | 1/2002 | Nash | G09F 13/04 40/564 |
| 2011/0090157 | A1 | 4/2011 | Chen | |
| 2012/0025018 | A1 * | 2/2012 | France | B64D 11/0023 244/118.6 |

FOREIGN PATENT DOCUMENTS

EP 2354836 A1 8/2011

OTHER PUBLICATIONS

International Search Report and Written Opinion issued on Apr. 17, 2014 in related PCT/US13/74490 application.

* cited by examiner

*Primary Examiner* — Alan Cariaso
(74) *Attorney, Agent, or Firm* — Jeffer Mangels; Butler & Mitchell LLP; Brennan C. Swain, Esq.

(57) ABSTRACT

A graphics display module that includes a frame with a front portion and a rear portion that cooperate to secure a lighted panel having a front surface and a rear surface therebetween. The front portion defines a central opening through which the front surface of the lighted panel can be viewed. The front portion and rear portion cooperate to define a channel that includes lighting disposed therein that is configured to back light the lighted panel.

11 Claims, 5 Drawing Sheets

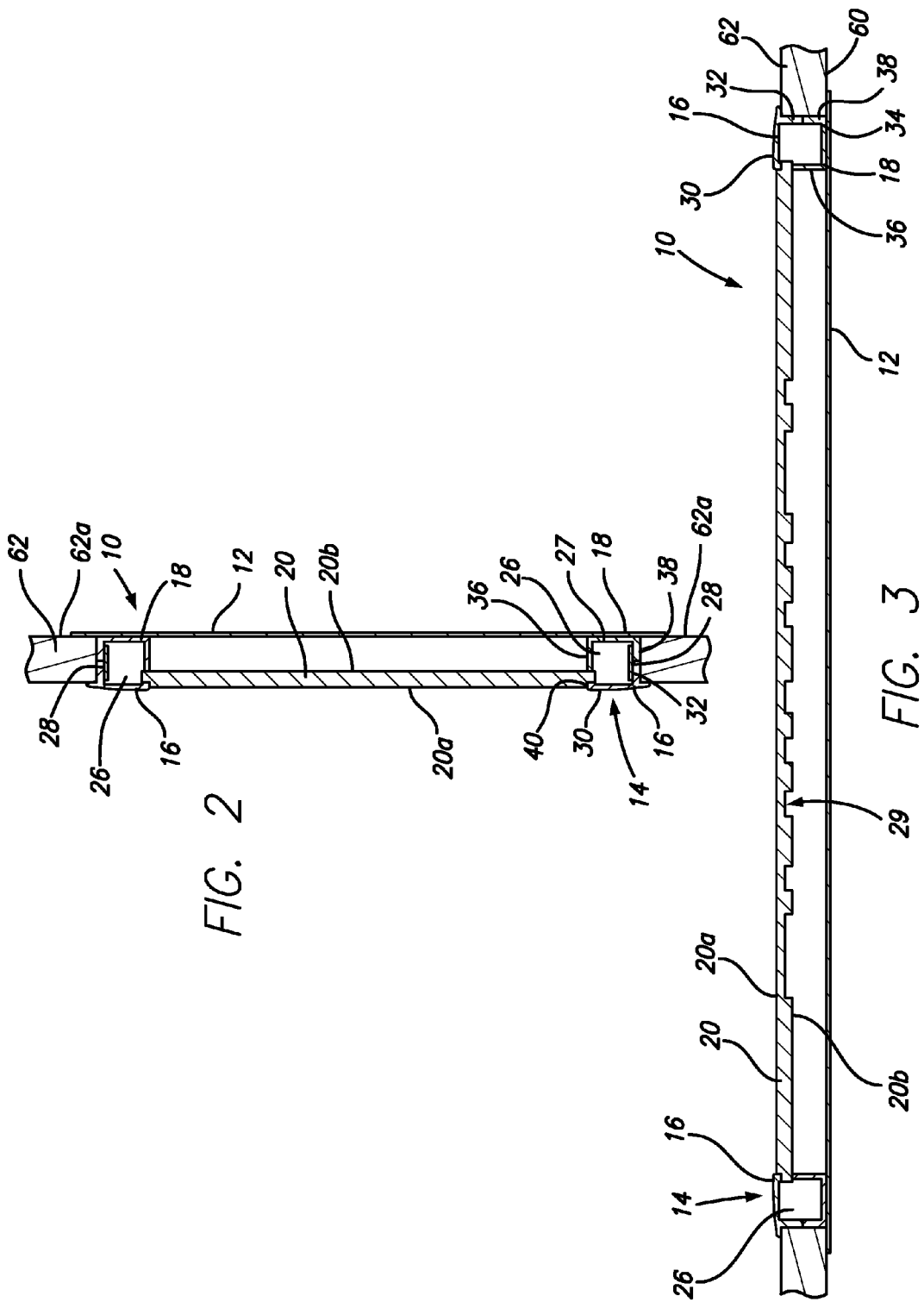

GRAPHICS DISPLAY MODULE

CROSS REFERENCE TO RELATED APPLICATIONS

This application claims the benefit of U.S. Provisional Application No. 61/735,962, filed Dec. 11, 2012, which is herein incorporated by reference in its entirety.

FIELD OF THE INVENTION

The present invention relates generally to a graphics display module, and more particularly to a graphics display module for an aircraft.

BACKGROUND OF THE INVENTION

Aircraft monuments or walls typically do not include any type of graphics thereon. Accordingly, a need exists for a monument that includes aesthetically pleasing graphics or the like thereon.

SUMMARY OF THE PREFERRED EMBODIMENTS

In accordance with a first aspect of the present invention there is provided a graphics display module that includes a frame with a front portion and a rear portion that cooperate to secure a lighted panel having a front surface and a rear surface therebetween. The front portion defines a central opening through which the front surface of the lighted panel can be viewed. The front portion and rear portion cooperate to define a channel that includes lighting disposed therein that is configured to back light the lighted panel. In a preferred embodiment, the lighted panel includes etching in the rear surface thereof. Preferably, the front portion includes a front frame member and a flange member extending rearwardly from the front frame member and the rear portion includes a rear frame member and inner and outer flange members extending forwardly from the rear frame member. The outer flange member of the rear portion abuts the flange member of the front portion, and the inner flange member of the rear portion abuts the rear surface of the lighted panel.

In a preferred embodiment, the lighted panel includes a circumferential groove defined in the front surface thereof, and a portion of the front frame member is seated in the groove. Preferably, the flange member of the front portion includes a series of front securing members extending inwardly therefrom, the outer flange member of the rear portion includes a series of rear securing members that correspond to the front securing members, and each of the front securing members are secured to one of the rear securing members. In a preferred embodiment, each of the front securing members include a first opening defined therein, each of the rear securing members include a first opening defined therein, and the front portion is secured to the rear portion by fasteners that are secured within the first openings of the front securing members and the first openings of the second securing members.

In a preferred embodiment the graphics display module includes a backing board that is configured to secure the graphics display module to a surface. The backing board is secured to the rear frame member of the rear portion. Preferably, each of the rear securing members include a second opening defined therein, and the backing board is secured to the rear portion by fasteners that are secured within the second openings in the rear securing members and openings defined in the backing board. Preferably, the lighting is LED lighting that is disposed in the channel and secured to the frame.

In accordance with a another aspect of the present invention there is provided a monument that is configured to be positioned in an aircraft that includes at least a first wall having an opening defined therein with a graphics display module secured within the opening. The graphics display module includes a frame that has a front portion and a rear portion that cooperate to secure a lighted panel having a front surface and a rear surface therebetween. The front portion defines a central opening through which the front surface of the lighted panel can be viewed and the front portion and rear portion cooperate to define a channel that includes lighting disposed therein that is configured to back light the lighted panel. In a preferred embodiment, the monument further includes a backing board having a front surface and a rear surface and that has a height and width that is larger than the height and width of the frame. The backing board is preferably secured to the rear frame member of the rear portion, and the front surface of the backing board is secured to the first wall of the monument such that the frame extends into the opening in the first wall.

In a preferred embodiment, the present invention provides a graphics display module to cleanly display a single, static graphical element such as a logo, picture, or pattern in a way that is attractive to people passing through the area. The present invention provides a lighted display with graphics and framing options.

BRIEF DESCRIPTION OF THE DRAWINGS

FIG. 2 is a cross section taken along line 2-2 of FIG. 1;

FIG. 3 is a cross section taken along line 3-3 of FIG. 1;

DETAILED DESCRIPTION OF THE PREFERRED EMBODIMENTS

Figure 1:
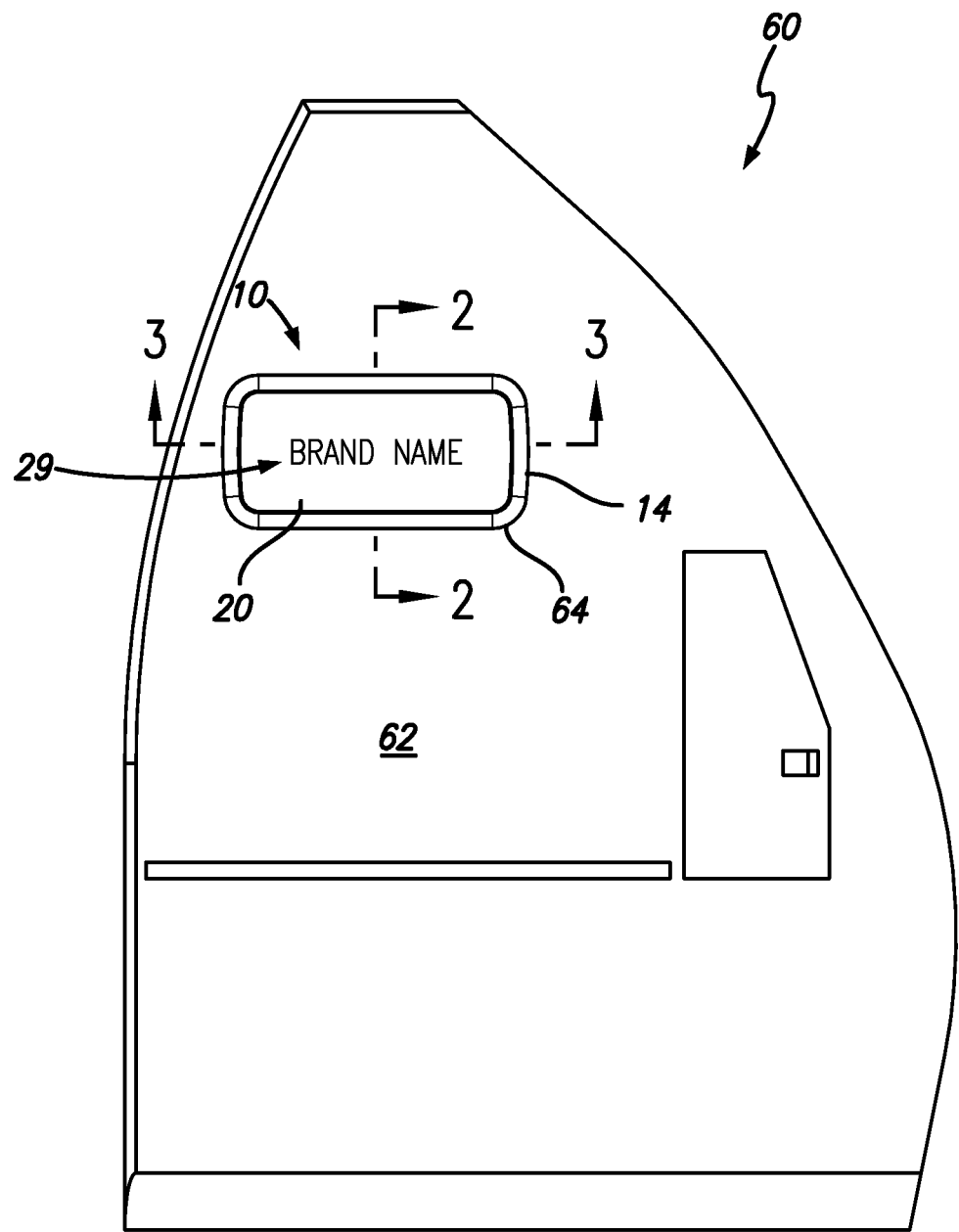
FIG. 1 is a front elevational view of a front row aircraft monument with a graphics display module in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show an embodiment of a graphics display module 10. In particular, the invention can be used on commercial passenger aircraft 100. However, this is not a limitation on the present invention and the graphics display module can be used elsewhere. In a preferred embodiment, the graphics display module 10 is configured to be located on the front row monument 60 of the aircraft 100. The graphics display module 10 can also be positioned on other monuments, such as a lavatory, closet, galley monument or the like. However, this is not a limitation on the present invention.

As is best shown in FIGS. 2-5, the graphic display module 10 preferably includes a backing board 12 and a frame 14 having a front portion 16 and a rear portion 18 that cooperate to house a translucent or transparent panel 20 having a front surface 20a and a rear surface 20b therein. The front portion 16 defines a central opening 22 through which the front surface 20a of the lighted panel 20 can be viewed. In a preferred embodiment, the rear portion 18 also includes a central opening 24 defined therein. The front portion 16 and rear portion 18 cooperate to define a channel 26 therearound that includes lighting 28 disposed therein that is configured to back light the lighted panel 20.

As shown in FIG. 1, in a preferred embodiment, the lighted panel 20 includes graphics or indicia 29 thereon (e.g., Brand Name). The indicia 29 can be machined or etched in to a surface of the lighted panel 20 or can be placed on a surface of the lighted panel 20 (e.g., a sticker or the like). FIG. 3 shows the indicia 29 etched into the rear surface 20b of the lighted panel 20.

With reference again to FIGS. 2-5, the front portion 16 of the frame 14 preferably includes a front frame member 30 and a flange member 32 extending rearwardly from the front frame member 30 and the rear portion 18 preferably includes a rear frame member 34 and inner and outer flange members 36 and 38 extending forwardly from the rear frame member 34. As shown in FIGS. 2-3, the outer flange member 38 of the rear portion 18 abuts the flange member 32 of the front portion 16, and the inner flange member 36 of the rear portion 18 abuts the rear surface 20b of the lighted panel 20. In a preferred embodiment, the lighted panel 20 includes a circumferential groove 40 defined in the front surface 20a thereof in which a portion of the front frame member 30 is seated. The groove 40 allows the visible front surface 20a of the lighted panel 20 to be flush or almost flush with the front frame member 30. However, this is not a limitation and in another embodiment, the frame 14 and/or lighted panel 20 can jut out or be inset.

Figure 4:
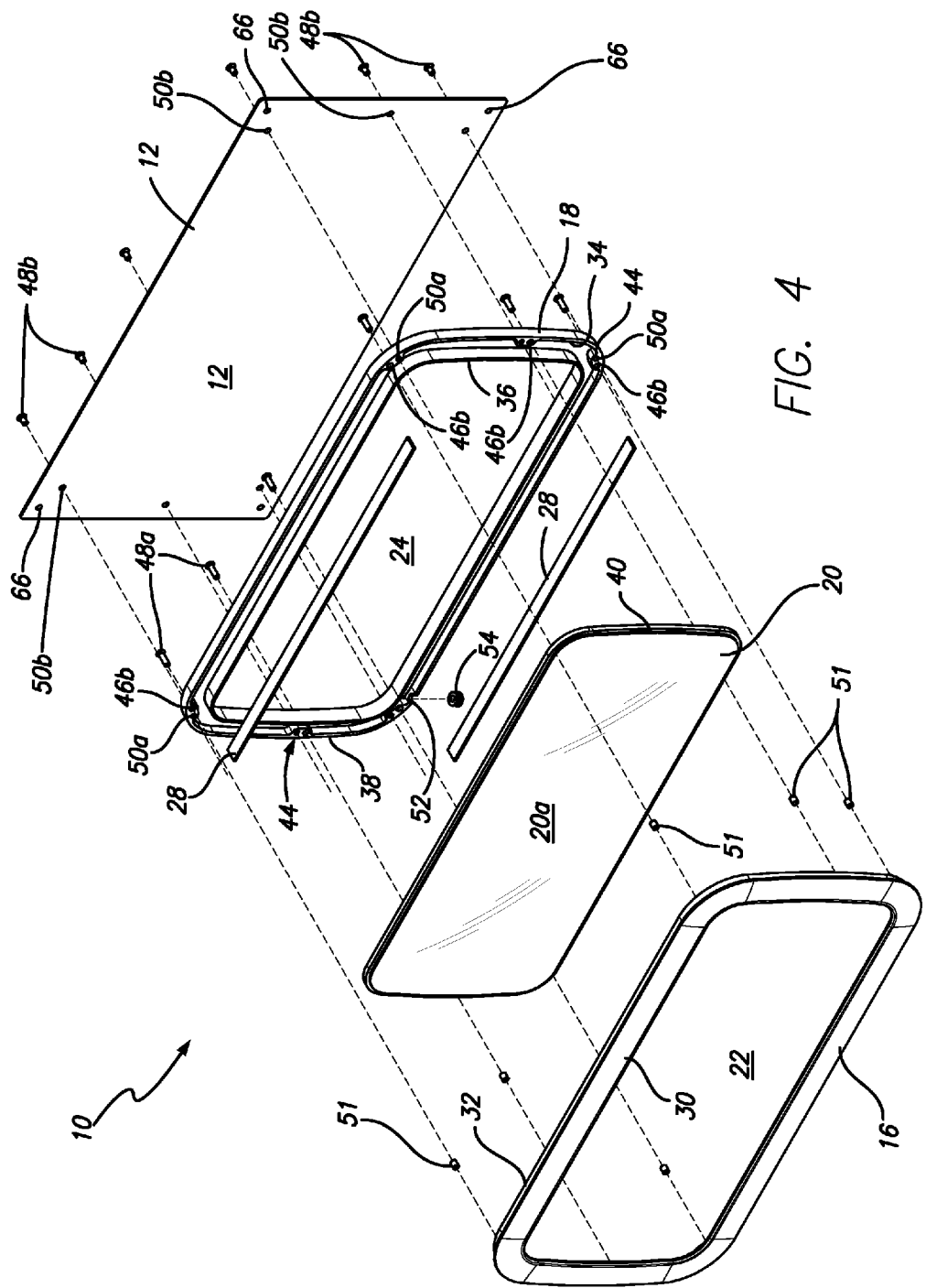
FIG. 4 is a front exploded perspective view of the graphics display module of FIG. 1.
Figure 5:
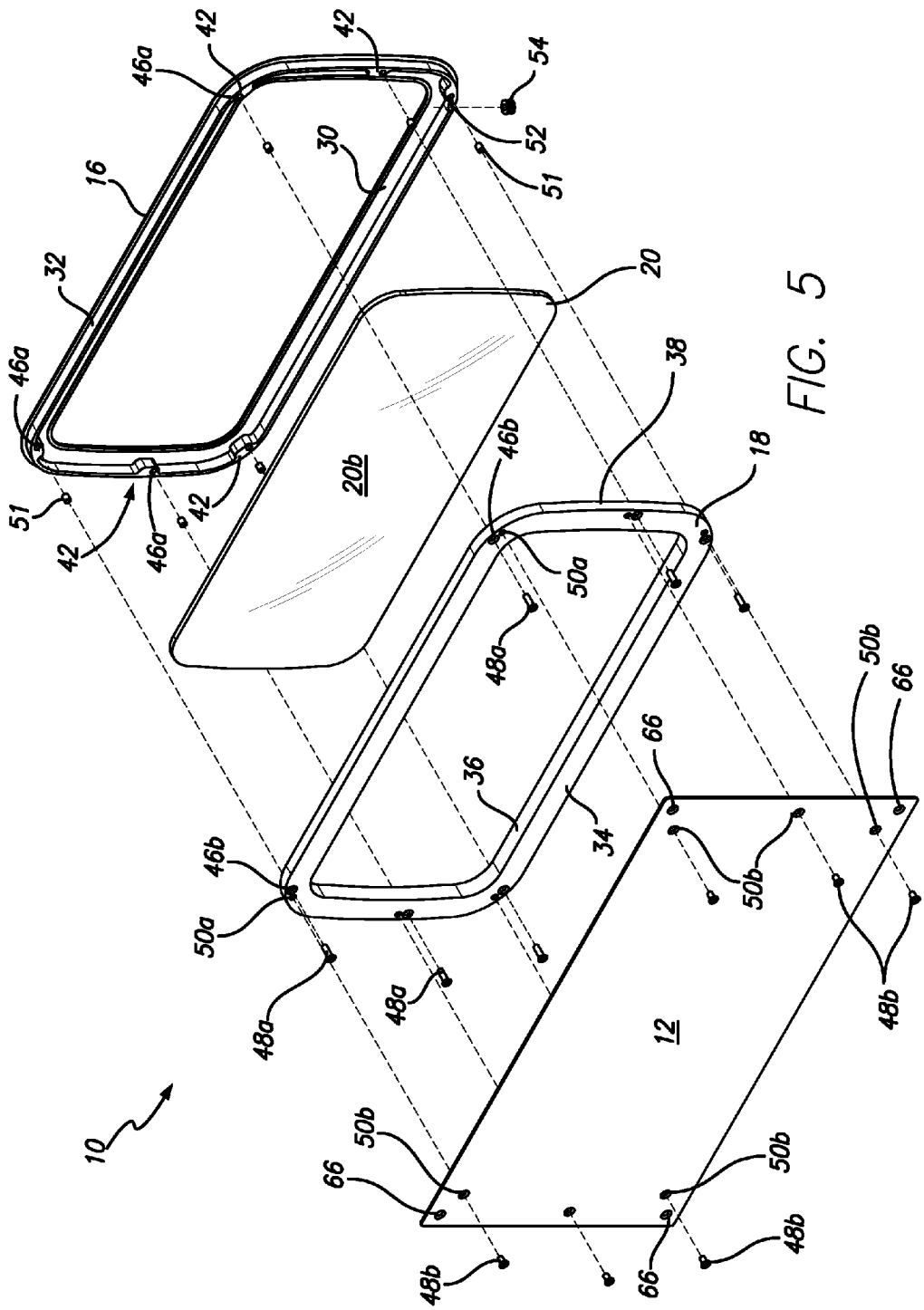
FIG. 5 is a rear exploded perspective view of the graphics display module of FIG. 1.
Figure 6:
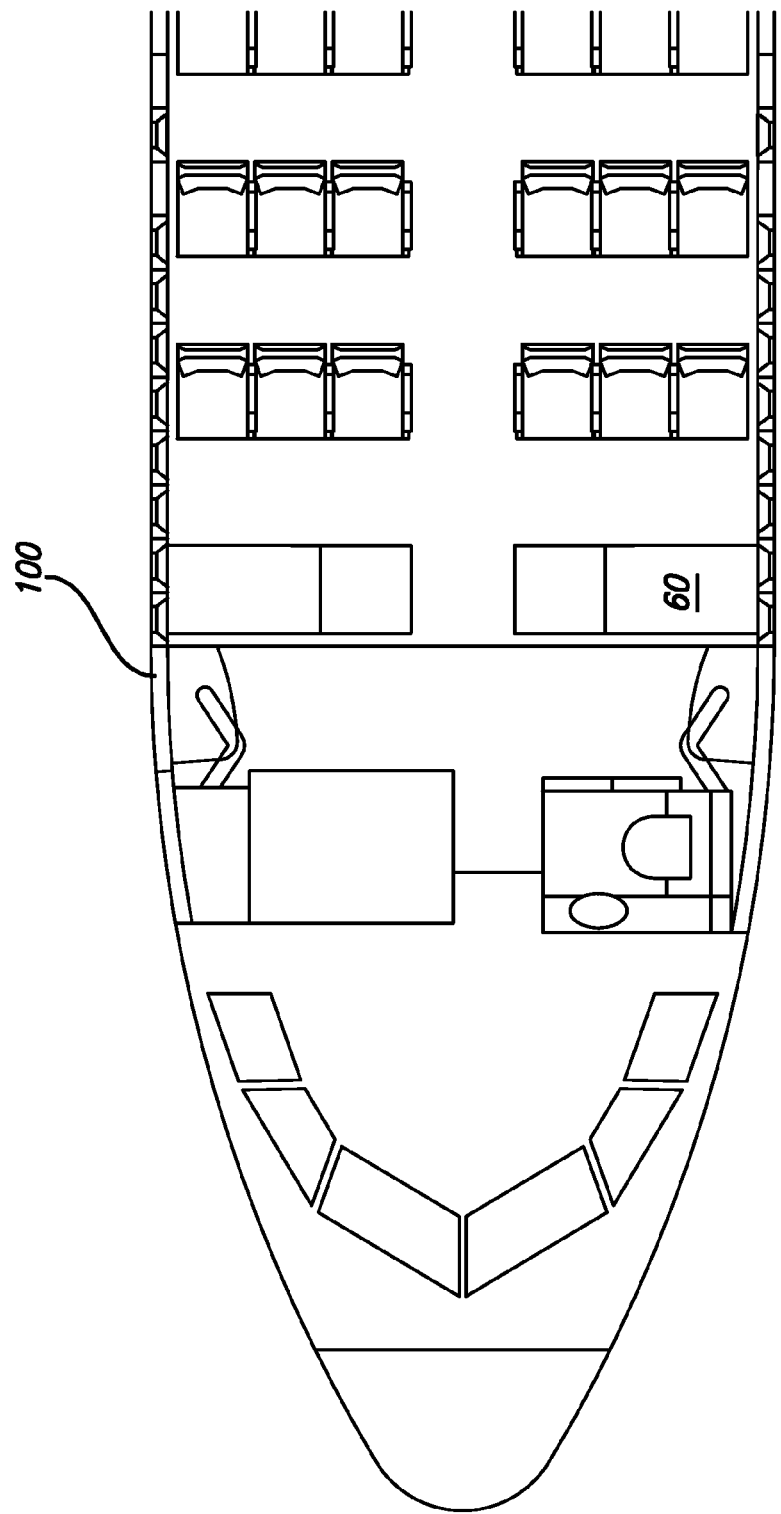
FIG. 6 is a plan view of an aircraft with the front row monument of FIG. 1 positioned therein.

The front and rear portions 16 and 18 of the frame can be secured to one another in a number of different ways, e.g., welding, adhesive, fasteners, etc. In a preferred embodiment, the front and rear portions 16 and 18 are secured together by fasteners, such as threaded fasteners (bolts, screws, etc.), rivets or the like. As shown in FIGS. 4-5, in a preferred embodiment, the flange member 32 of the front portion 16 includes a series of front securing members 42 extending inwardly therefrom and the outer flange member 38 of the rear portion 18 includes a series of rear securing members 44 that correspond to the front securing members 42. Preferably, each of the front securing members 42 include an opening 46a defined therein and each of the rear securing members 44 include a corresponding first opening 46b defined therein. With this configuration, the front portion 16 is secured to the rear portion 18 by fasteners 48a that are secured within the openings 46a of the front securing members 42 and the first openings 46b of the rear securing members 44.

As shown in FIG. 4, in a preferred embodiment, the rear securing members 44 also include second openings 50a defined therein and that extend through the rear frame member 34. Backing board 12 includes openings 50b therein that correspond to the second openings 50a in the rear securing members 44. With this configuration, the backing board 12 is secured to the rear portion 18 by fasteners 48b that are secured within the second openings 50a in the rear securing members 44 and the openings 50b defined in the backing board 12. In a preferred embodiment, as shown in FIGS. 4-5, fasteners 48a are longer than fasteners 48b. However, this is not a limitation on the present invention. In another embodiment, the backing board 12 can be glued, adhered, welded or secured to the frame 14 in another manner. The frame 14 can be made of metal (e.g., aluminum) and included threaded openings for the fasteners or can be made of plastic. The frame 14 can also include threaded inserts 51 positioned in any or all of the openings.

It will be appreciated that any type of lighting is within the scope of the present invention. However, as shown in FIGS. 2 and 4, in a preferred embodiment, the lighting is LED strip lighting 28 that is disposed in the channel 26 and secured to an interior surface of the frame 14. In embodiment is the invention, the lighting can be glowing, pulsing or 3D, if desired. In a preferred embodiment, the frame 14 includes a cord opening 52 defined therein through which electrical power can be provided to the lighting 28. The opening can include a grommet 54. In another embodiment, the electrical power source can be located within the frame 14 (e.g., in channel 26).

As discussed above, in a preferred embodiment, the graphics display module 10 is secured in or mounted on a first wall 62 of a monument 60 that is configured to be positioned in an aircraft 11. As shown in FIG. 1, the graphics display module 10 is secured within an opening 64 defined in the first wall 62. In a preferred embodiment, the front surface of the backing board 12 is positioned adjacent to and secured to the rear surface 62a of the first wall 62 of the monument 60 such that the frame 14 extends into the opening 64. The backing board 12 can include openings 66 therein through which fasteners can extend to secure the backing board 12 (and entire graphics display module 10) in place. In another embodiment, the lighted panel 20 can be secured within the opening 64 in the monument 60 with a snap fit configuration, brackets, direct mechanical fasteners, glue or the like.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A graphics display module comprising: a frame that includes a front portion and a rear portion that cooperate to secure a lighted panel having a front surface and a rear surface therebetween, wherein the front portion defines a central opening through which the front surface of the lighted panel can be viewed and includes a front frame member and a flange member extending rearwardly from the front frame member, wherein the front portion and rear portion cooperate to define a channel that includes lighting disposed therein that is configured to back light the lighted panel, wherein the lighted panel includes etching in the rear surface thereof, wherein the rear portion includes a rear frame member and inner and outer flange members extending forwardly from the rear frame member, wherein the outer flange member of the rear portion abuts the flange member of the front portion, wherein the inner flange member of the rear portion abuts the rear surface of the lighted panel, [wherein the rear portion includes a rear frame member and inner and outer flange members extending forwardly from the rear frame member, wherein the outer flange member of the rear portion abuts the flange member of the front portion, and wherein the inner flange member of the rear portion abuts the rear surface of the lighted panel] wherein the lighted panel includes a circumferential groove defined in the front surface thereof, and wherein a portion of the front frame member is seated in the groove.

2. The graphics display module of claim 1 wherein the flange member of the front portion includes a series of front securing members extending inwardly therefrom, wherein the outer flange member of the rear portion includes a series of rear securing members that correspond to the front securing members, and wherein each of the front securing members are secured to one of the rear securing members.

3. The graphics display module of claim 2 wherein each of the front securing members include a first opening defined therein, wherein each of the rear securing members include a first opening defined therein, and wherein the front portion is secured to the rear portion by fasteners that are secured within the first openings of the front securing members and the first openings of the second securing members.

4. The graphics display module of claim 3 further comprising a backing board configured to secure the graphics display module to a surface, wherein the backing board is secured to the rear frame member of the rear portion.

5. The graphics display module of claim 4 wherein each of the rear securing members include a second opening defined therein, and wherein the backing board is secured to the rear portion by fasteners that are secured within the second openings in the rear securing members and openings defined in the backing board.

6. The graphics display module of claim 4 wherein the lighting is LED lighting that is disposed in the channel and secured to the frame.

7. A monument that is configured to be positioned in an aircraft, the monument comprising:
at least a first wall having an opening defined therein, wherein a graphics display module is secured within the opening, wherein the graphics display module comprises a frame that includes a front portion and a rear portion that cooperate to secure a lighted panel having a front surface and a rear surface therebetween, wherein the front portion defines a central opening through which the front surface of the lighted panel can be viewed and includes a front frame member and a flange member extending rearwardly from the frame member, wherein the front portion and rear portion cooperate to define a channel that includes lighting disposed therein that is configured to back light the lighted panel, wherein the rear portion includes a rear frame member and inner and outer flange members extending forwardly therefrom, wherein the outer flange member of the rear portion abuts the flange member of the front portion, wherein the inner flange member of the rear portion abuts the rear surface of the lighted panel, wherein the flange member of the front portion includes a series of front securing members extending inwardly therefrom, wherein the outer flange member of the rear portion includes a series of rear securing members that correspond to the front securing members, wherein each of the front securing members are secured to one of the rear securing members, wherein each of the front securing members include a first opening defined therein, wherein each of the rear securing members include a first opening defined therein, and wherein the front portion is secured to the rear portion by fasteners that are secured within the first openings of the front securing members and the first openings of the second securing members, and
a backing board having a front surface and a rear surface and that has a height and width that is larger than the height and width of the frame, wherein the backing board is secured to the rear frame member of the rear portion, and wherein the front surface of the backing board is secured to the first wall of the monument such that the frame extends into the opening in the first wall.

8. The monument of claim 7 wherein each of the rear securing members include a second opening defined therein, and wherein the backing board is secured to the rear portion by fasteners that are secured within the second openings in the rear securing members and openings defined in the backing board.

9. The monument of claim 8 wherein the lighted panel includes a circumferential groove defined in the front surface thereof, and wherein a portion of the front frame member is seated in the groove.

10. The monument of claim 9 wherein the lighting is LED lighting that is disposed in the channel and secured to the frame.

11. The monument of claim 10 wherein the lighted panel includes etching in the rear surface thereof.

* * * * *